(12) United States Patent
Gill et al.

(10) Patent No.: US 8,797,051 B1
(45) Date of Patent: Aug. 5, 2014

(54) MINIMIZING VOLTAGE DROPS ON PRINTED CIRCUIT BOARDS (PCBS) BY USING CURRENT INJECTORS

(75) Inventors: Jaspal Gill, Tracy, CA (US); David Owen, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 662 days.

(21) Appl. No.: 13/090,388

(22) Filed: Apr. 20, 2011

(51) Int. Cl.
*G01R 27/08* (2006.01)

(52) U.S. Cl.
USPC .......................... 324/713; 324/600; 324/647

(58) Field of Classification Search
USPC .............. 324/712–718, 600, 76.11, 105, 142; 320/116–127
See application file for complete search history.

(56) References Cited

U.S. PATENT DOCUMENTS 7,602,145 B2 * 10/2009 Renda ........................... 320/119

* cited by examiner

*Primary Examiner* — Melissa Koval
*Assistant Examiner* — Trung Nguyen
(74) *Attorney, Agent, or Firm* — Harrity & Harrity, LLP

(57) ABSTRACT

A device determines a first voltage measurement of an output of a first brick. The device further determines a second voltage measurement associated with a second brick. The first brick is larger in size than the second brick. The device ramps up an output voltage of the second brick when the second voltage measurement is less than the first voltage measurement.

20 Claims, 4 Drawing Sheets

US 8,797,051 B1

MINIMIZING VOLTAGE DROPS ON PRINTED CIRCUIT BOARDS (PCBS) BY USING CURRENT INJECTORS

BACKGROUND

High performance integrated circuits (e.g., microprocessors) have specifications that are tightening voltage regulations on printed circuit boards (PCBs), such as motherboards. These voltage regulations are requiring decreasing amounts of allowable voltage drops on the PCBs. These specifications often conflict with device designers' goals as devices, such as network devices, are becoming more complex. These goals include fitting an increasing quantity of components, such as memory chips, microprocessors, ASICs, signal processors, etc., onto PCBs and to reduce sizes of PCBs to allow the devices to be as small as possible.

One current solution, to meet the aforementioned integrated circuit specifications and the large power load requirement of the components, is to place two large bricks (DC/DC converters) on a PCB (e.g., one large brick on each end of the PCB). These large bricks take up a lot of space on the PCB, cause power-up/power-down sequencing issues, and often require placing load sharing circuitry on the PCB. Another solution is to provide a dedicated DC/DC converter for each integrated circuit of a PCB. However, this solution occupies even more space of the PCB and is even more costly than the two large bricks solution. Also, these solutions may require additional multiple layers of thick copper, which further occupy additional space of a PCB and increase costs.

SUMMARY

According to one aspect, a method may include: determining a first voltage measurement of an output of a first brick; determining a second voltage measurement associated with a second brick; determining whether the second voltage measurement is less than the first voltage measurement; and ramping up an output voltage of the second brick when the second voltage measurement is less than the first voltage measurement.

According to another aspect, a device may include a circuit board. The circuit board may include a plurality of chips, a first brick to provide a first voltage to the plurality of chips; a second brick to provide, based on a value of the first voltage, a second voltage to the plurality of chips; and a remote sense line to provide the value of the first voltage from the first brick to the second brick. The first brick may be larger in size than the second brick. The second brick may ramp up the second voltage when the second voltage is less than the first voltage.

According to yet another aspect, a brick, of a printed circuit board, may include: a first connection, a second connection, and a current injector. The first connection may receive a first voltage measurement of an output of a another brick. The size of the brick may be smaller than a size of the other brick. The second connection may receive a second voltage measurement measured at a sensing point on the printed circuit board. The current injector may determine an amount of current to inject based on the first voltage measurement and the second voltage measurement, and inject the amount of current into an impedance to produce a voltage output. The voltage output may be ramped up when the second voltage measurement is less than the first voltage measurement.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the embodiments. Instead, the scope of the embodiments is defined by the appended claims and their equivalents.

An embodiment, described herein, may minimize voltage drops on a printed circuit board (PCB). The PCB may include a large brick, on one side of the PCB, and a small brick, on the other side of the PCB. The large brick may take up more PCB space than the small brick. The small brick may include a current injector. The small brick and the large brick may provide power (i.e., voltage) to chips on the PCB. The small brick may determine a first voltage measurement of an output of the large brick, via a remote sense line connected to the large brick. The small brick may also determine a second voltage measurement associated with the small brick. The second voltage measurement may represent a voltage output of the small brick or a measurement by a remote sense point located in proximity to the small brick. The small brick may ramp up an amount of current being injected (onto the PCB) while keeping the second voltage measurement less than the first voltage measurement.

Figure 1:
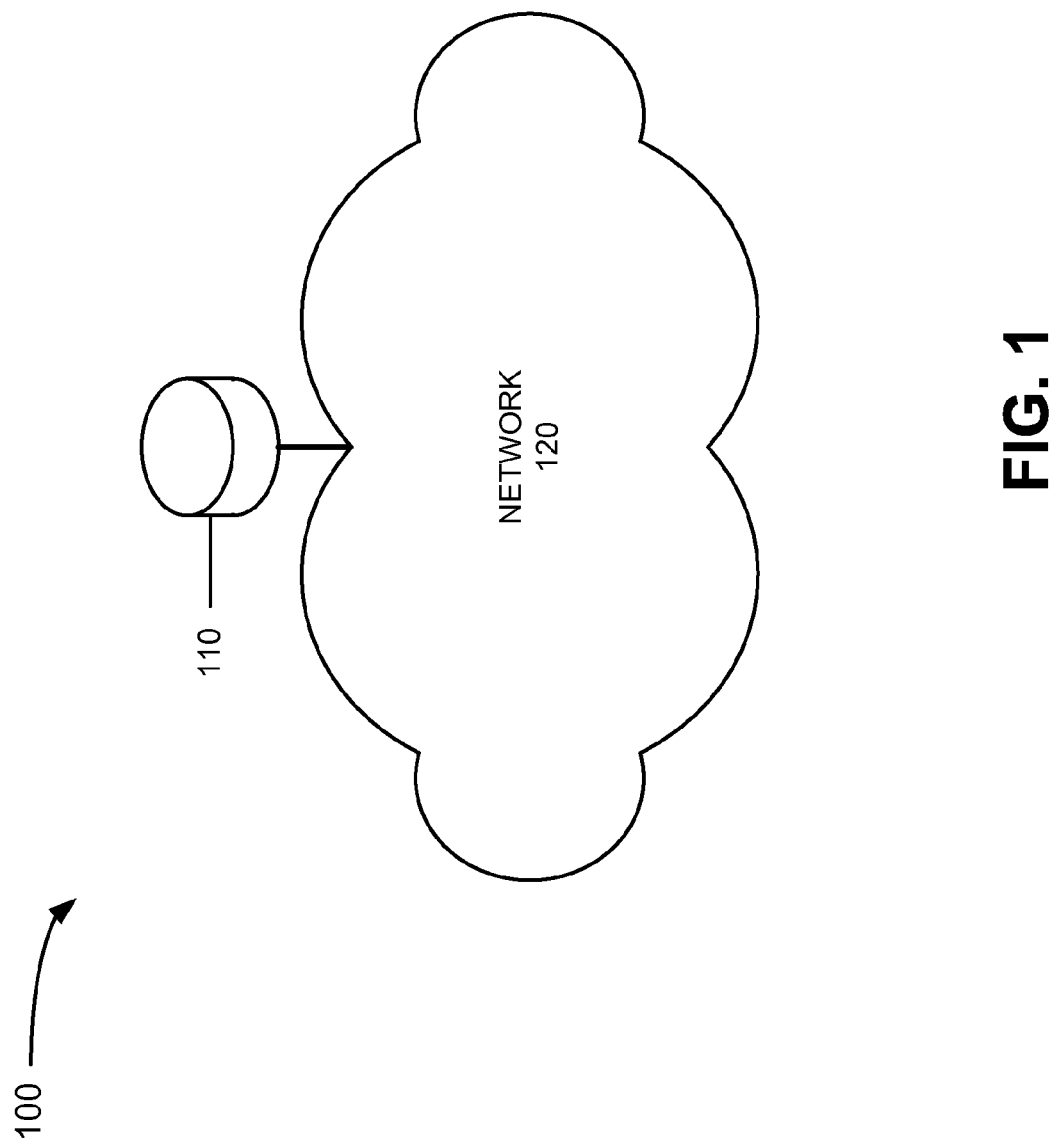
FIG. 1 is a diagram of an example environment in which systems and/or methods described herein may be implemented.

FIG. 1 is a diagram of an example environment 100 in which systems and/or methods described herein may be implemented. Environment 100 may include a device 110 and a network 120. Device 110 may include a networking device for performing network-related functions, such as a router, a server, or a switch. Alternatively, device 110 may include a computing device, a communication device, etc., that communicates via network 120. Network 120 may include the Internet, an ad hoc network, a local area network (LAN), a wide area network (WAN), a metropolitan area network (MAN), a cellular network, a public switched telephone network (PSTN), any other network, or a combination of networks. Device 110 may communicate with other devices (not shown) and may communicate through wired and/or wireless communication links via network 120.

Figure 2:
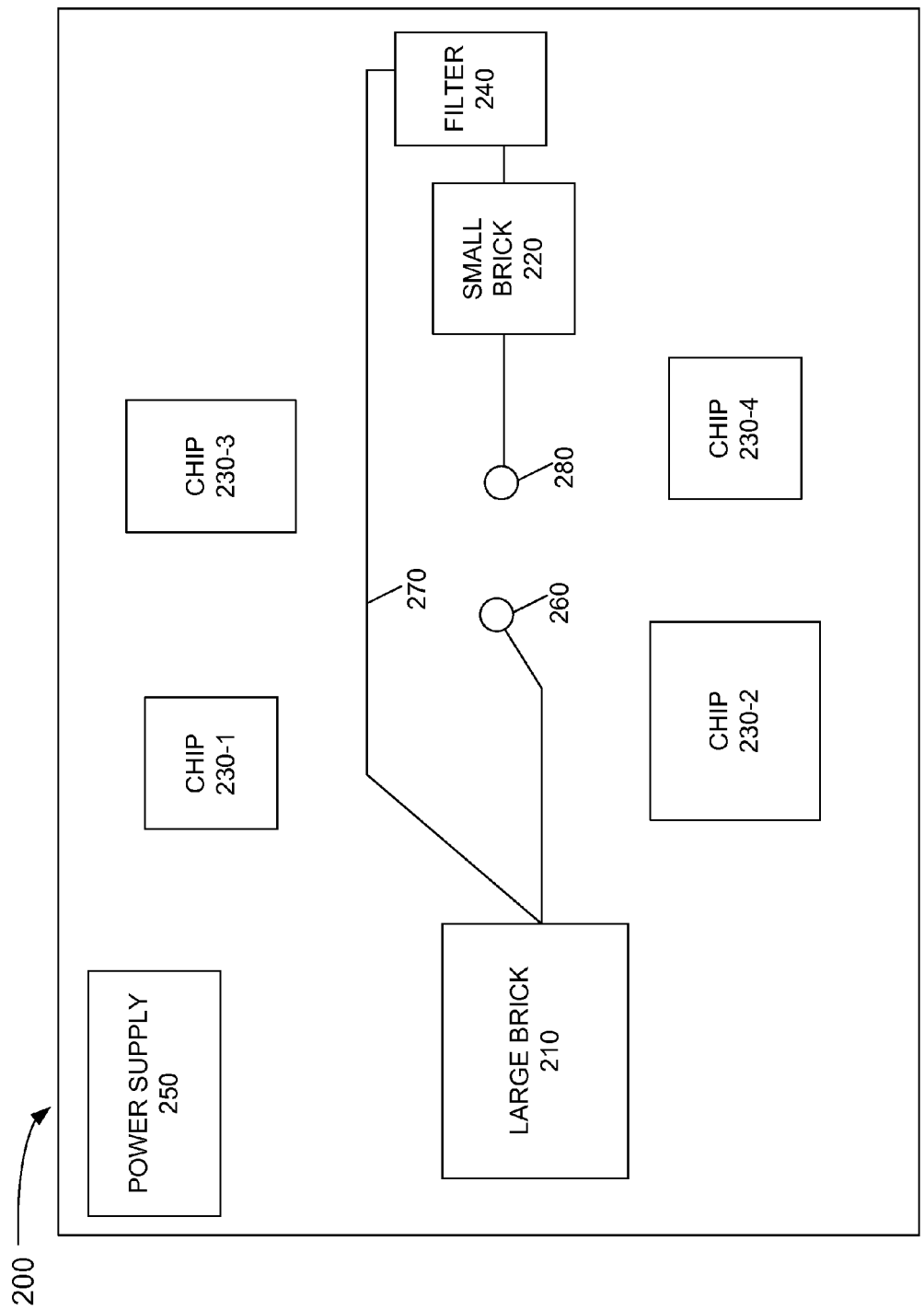
FIG. 2 is a diagram of example components of a printed circuit board (PCB) included in a device of FIG. 1.

FIG. 2 is a diagram of example components of a printed circuit board (PCB) 200 included in device 110. If device 110 is configured as a network device that controls forwarding of data, for example, there may be any number of PCBs 200 included in device 110. For example, if device 110 is configured as a router, device 110 may include a number of line cards (e.g., 14 line cards). Each one of the line cards may include a PCB 200. PCB 200 may include one or more of the following components: a large brick 210, a small brick 220, a chip 230-1, a chip 230-2, a chip 230-3, a chip 230-4, a filter 240, a power supply 250, a remote sense point 260, a remote sense line 270, and a remote sense point 280. Chip 230-1, chip 230-2, chip 230-3, chip 230-4 may be referred to as chips 230. PCB 200 is provided for explanatory purposes only. In practice, PCB 200 may include additional components, fewer components, different components, and/or differently arranged components. For example, a quantity of chips 230 may differ, and, in practice, there may be many more chips 230.

Large brick 210 may include any component that is able to provide power to chips 230. In one implementation, large brick 210 may include power circuitry, storage capacitors, and a direct current (DC)/DC converter. The power circuitry may include switches and other circuitry used to receive power from a source outside of PCB 200 (or from another point on PCB 200) and deliver the power to the storage capacitors. The power may include, for example, an input voltage of a particular DC voltage (e.g., 48 volts DC). The storage capacitors may store the power received from the power circuitry. The storage capacitors may include, for example, electrolytic capacitors. The DC/DC converter may receive DC voltage from the storage capacitors. The DC/DC converter may include circuitry to convert a received DC voltage into another DC voltage. For example, the input voltage to the DC/DC converter may be of a first voltage (e.g., 48 volts) and the output voltage may be of a second voltage (e.g., about 1 volt). Chips 230 may receive the output voltage as power from large brick 210. In other implementations, large brick 210 may include only the DC/DC converter, and the power circuitry and/or the storage capacitors may be located, outside of large brick 210, on PCB 200.

Large brick 210 may also include a connection to remote sense point 260. In one implementation, remote sense point 260 may be located in the middle of PCB 200. Remote sense point 260 may measure the voltage at a location of remote sense point 260. Large brick 210 may adjust the output voltage based on the measurement of the voltage to maintain a particular voltage at the location of remote sense point 260. For example, large brick 210 may begin by outputting 1.05 volts. By the time that the power reaches the location of remote sense point 260, the voltage may decrease to 1 volt. Large brick 210 may increase or decrease the output voltage to maintain 1 volt at the location of remote sense point 260.

Chips 230 may include any type of electronic circuits that may receive power from large brick 210 and/or small brick 220. Chips 230 may include, for example, one or more of the following types of chips: memories, microprocessors, application-specific integrated circuits (ASICs), signal processors, etc. Two or more of chips 230 may be of a same type or of different types.

Small brick 220 may include any component, smaller in size than large brick 210, which is able to provide additional power to chips 230. For example, small brick 220 may be half the size of large brick 210 (or another portion of large brick 210). Small brick 220 may include one or more components of the same type as those of large brick 210. For example, in one implementation, small brick 220 may include a DC/DC converter. Small brick 220 may receive input voltage from a power source different from the one that provides power to larger brick 210. The power source may be available on PCB 200 or located external to PCB 200. For example, small brick 220 may receive input voltage from power supplied by power supply 250. Small brick 220 may receive, for example, an input voltage of a particular DC voltage (e.g., 3 volts).

Small brick 220 may also include a current injector, a first connection, via filter 240, to remote sense line 270, and a second connection to remote sense point 280. Remote sense line 270 may provide a first measurement of the output voltage that is out from large brick 210. Small brick 220 may receive the first measurement via the first connection. Remote sense point 280 may provide a second measurement of the voltage of small brick 220 or of the voltage at a location of remote sense point 280. Small brick 220 may receive the second measurement via the second connection. In another embodiment, the second connection may determine a value of a voltage output of small brick 220. Small brick 220 may adjust an amount of the current the current injector injects in order for the second measurement (e.g., of the voltage of small brick 220) to equal the first measurement (of the voltage of large brick 210). The current injector of small brick 220 may inject current into an impedance to produce the voltage output. Chips 230 may receive the voltage output from small brick 220.

Filter 240 may include one or more resistors that filter the measurement of the output voltage provided by remote sense line 270. By the time that the output voltage moves from large brick 210 to filter 240, noise that is on PCB 200 is added to the output voltage. Filter 240 acts as an amplifier/filtering mechanism that eliminates the noise and provides a relatively clean DC voltage value as the measurement. Small brick 220 may receive the measurement from filter 240.

Power supply 250 may include any component that is able to provide power to one or more components of PCB 200, excluding chips 230. Power supply 250 may include power circuitry, storage capacitors, and/or DC/DC converters. In one implementation, power supply 250 may receive power from the same source that large brick 210 receives power. Power supply 250 may convert a received input DC voltage into another output DC voltage, which is not usable by chips 230. For example, the input voltage to the DC/DC converter may be of a first voltage (e.g., 48 volts) and the output voltage may be of a second voltage (e.g., 3 volts). A current flow of the output voltage may move across PCB 200. Small brick 220 may receive the current flow as its input voltage.

Figure 3:
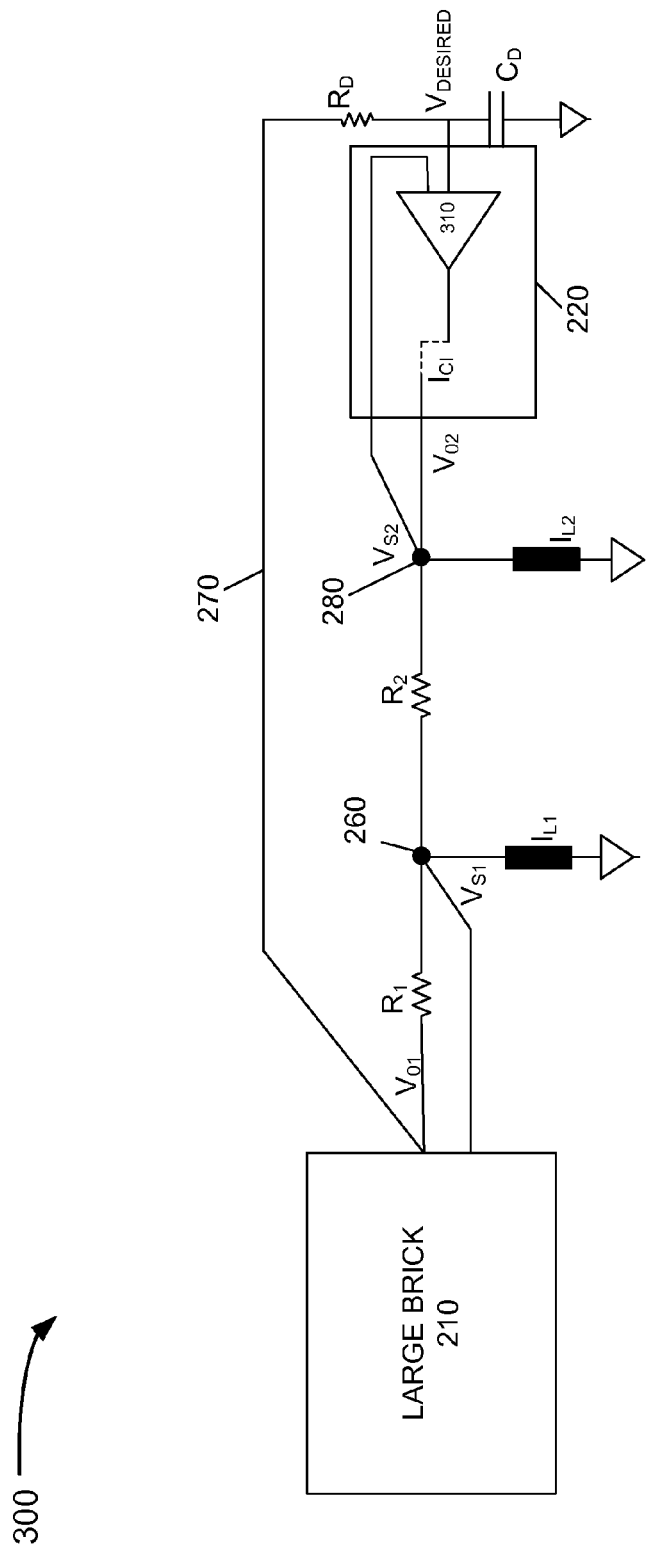
FIG. 3 is a schematic diagram of example circuitry included in a portion of the PCB of FIG. 2.

FIG. 3 is a schematic diagram of an example circuitry included in a portion 300 of PCB 200. Portion 300 may include large brick 210, small brick 220, remote sense point 260, remote sense line 270, remote sense point 280, resistors $R_1$, $R_2$, and $R_D$, injector lines $I_{L1}$ and $I_{L2}$, and capacitor $C_D$. Portion 300 is provided for explanatory purposes only. In practice, portion 300 may include more components, fewer components, different components, and/or differently arranged components.

Device 110, which includes PCB 200, may power on. As a result, large brick 210 may receive an input voltage (e.g., 48 volts) via one or more capacitors and/or filters (not shown in FIG. 3). Large brick 210 may convert the received input voltage into output voltage ($V_{O1}$). Large brick 210 may also receive a voltage measurement ($V_{S1}$) from remote sense point 260, which measures $V_{S1}$ at a location of remote sense point 260. Large brick 210 may ramp up a value of $V_{O1}$ until $V_{S1}$ equals a predefined value. $V_{O1}$ may decrease in value while moving across PCB 200 via resistors $R_1$ and $R_2$. For example, assume that large brick 210 initially outputs 1 volt for $V_{O1}$. When large brick 210 outputs 1 volt for $V_{O1}$, remote sense point 260 may measure, for example, 0.95 volts for $V_{S1}$ when small brick 220 does not provide any voltage (e.g., before small brick 220 provides voltage, as described further below). Large brick 210 may ramp up a value of $V_{O1}$ (e.g., to a value between 1.025 and 1.05 volts) until $V_{S1}$ reaches a predefined value (e.g., 1 volt). As described below, the value of $V_{O1}$ may never reach 1.05 volts when small brick 220 also provides voltage to PCB 200.

Chips 230-1 and 230-2 (FIG. 2) may correspond to injector line $I_{L1}$ and chips 230-3 and 230-4 2 (FIG. 2) may correspond to injector line $I_{L2}$. Chips 230-1 and 230-2 may receive power via injector line $I_{L1}$. Chips 230-3 and 230-4 may receive power via injector line $I_{L2}$.

Small brick 220 may include a current injector 310. Small brick 220 may receive an input voltage (e.g., 3 volts) from a power source on PCB 200 (e.g., power supply 250 of FIG. 2). Small brick 220 may use the input voltage for current injector 310 to produce and inject a current ($I_{CI}$) into an impedance. When current $I_{CI}$ is injected into the impedance, a voltage ($V_{O2}$) may be produced.

Remote sense line 270 may provide a voltage measurement of the output voltage ($V_{O1}$) of large brick 210 to small brick 220. Resistor $R_D$ and capacitor $C_D$ may serve as a filtering mechanism and/or an amplifier to produce a clean voltage measurement ($V_{DESIRED}$) of voltage $V_{O1}$ (i.e., $V_{DESIRED}$ equals $V_{O1}$). Small brick 220 may also receive a voltage measurement ($V_{S2}$) from remote sense point 280, which measures $V_{S2}$ at a location of remote sense point 280. In another embodiment, small brick 220 may receive a value of $V_{O2}$ as the voltage measurement instead of $V_{S2}$. Current injector 310 may adjust the amount of current $I_{CI}$ that is being injected into the impedance for a value of $V_{S2}$ or $V_{O2}$ to equal a value of $V_{DESIRED}$. For example, assume that while large brick 210 is ramping up a value of $V_{O1}$ up to 1.05 volts (i.e., without reaching 1.05 volts), current injector 310 is ramping up an amount of current injected in order for a value of $V_{S2}$ or $V_{O2}$ to equal $V_{DESIRED}$.

$V_{O2}$ may decrease in value while moving across PCB 200, towards large brick 210, via resistors $R_1$ and $R_2$. Power, which originates as $V_{O1}$ and $V_{O2}$, may meet up/combine between large brick 210 and small brick 220. As a result, for example, remote sense point 250 may measure the predefined value (e.g., 1 volt) for $V_{S1}$ (i.e., $V_{S1}$ may reach the predefined value) quicker when both large brick 210 and small brick 220 provide power than when only large brick 210 provides power. Large brick 210 may switch from a transient state to a steady state when $V_{S1}$ reaches the predefined value. In the transient state, large brick 210 may ramp up $V_{O1}$ for $V_{S1}$ to reach the predefined value. In the example above, PCB 200 may maintain the steady state as each one of large brick 210 and small brick 220 provide about 1.025 volts without ever ramping all the way up to 1.05 volts.

In another embodiment, PCB 200 (and portion 300) may include multiple small bricks, each one with a separate current injector. Each one of the small bricks may receive a measurement of voltage being outputted by large brick 210 via different remote sense lines. The current injectors may adjust the amounts of current that they inject based on the measurement of voltage being outputted by large brick 210. A user may define how to calculate the amount of current to inject based on the measurement.

In yet another embodiment, small brick 220, with current injector 310, may only provide $V_{O2}$ during a transient state. A transient capability of current injector 310 may be much (e.g., 10-20 times) greater than that of a large brick 210. For example, large brick 210 may provide $V_{O1}$ at a 10 kHz bandwidth while current injector may inject $I_{CI}$ at a 100 kHz bandwidth. Current injector 310 may not inject any current until remote sense point 280 provides a value of $V_{S2}$ (e.g., 0.95 volts) that is below a particular predefined threshold (e.g., 1 volt). For example, when remote sense point 280 provides a value of $V_{S2}$ that is below the particular predefined threshold, current injector 310 may determine a voltage drop for chips 230-3 and 230-4, which correspond to $I_{L2}$ originating at remote sense point 280. In response, current injector 310 may inject current using its higher bandwidth to minimize an amount of time of the voltage drop. Current injector 310 may stop injecting current (i.e., providing power) when the value of $V_{S2}$ once again rises to the particular predefined threshold and/or when $V_{S2}$ or $V_{O2}$ equal $V_{DESIRED}$ (i.e., when PCB 200 returns to the steady state).

In other implementations, multiple small bricks, with current injectors, may only provide power during the transient state. Each one of the small bricks may receive a measurement of voltage from a remote sensor (e.g., a remote sense point, a remote sense line) corresponding to a group of one or more chips. Each one of the small bricks, with their current injectors, may respond and operate as current injector 310 in the above paragraph.

Figure 4:
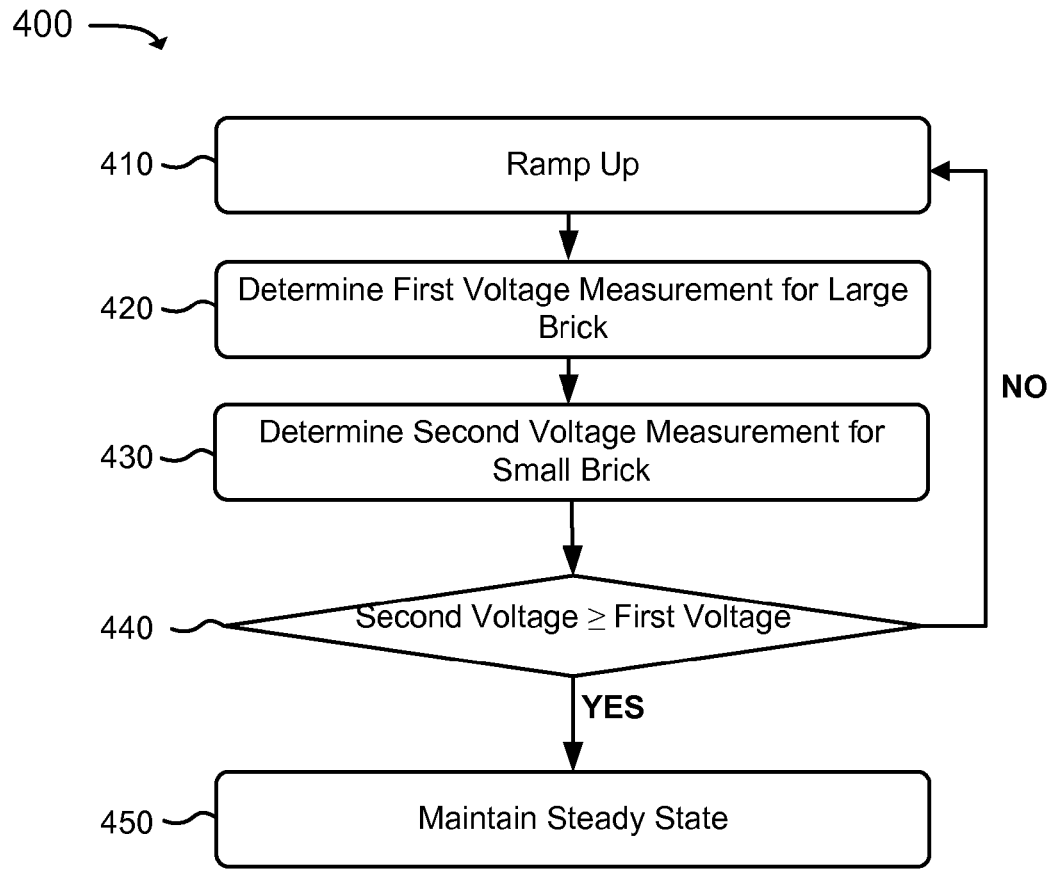
FIG. 4 is a flowchart of an example process for minimizing voltage drops.

FIG. 4 is a flowchart of an example process 400 for minimizing voltage drops. PCB 200 may perform process 400. Before process 400 begins, power supply 250 may receive an input voltage (e.g., 48 volts) at the same time as large brick 210 receives the input voltage. Power supply 250 may convert the input voltage into another voltage (e.g., 3 volts). Power supply 250 may output the other voltage across PCB 200. Small brick 220 may power on when small brick 220 receives the other voltage.

As shown in FIG. 4, process 400 may include ramping up (block 410). For example, large brick 210 may convert the input voltage (e.g., 48 volts) into an output voltage (e.g., between 0.95 and 1.05 volts). Large brick 210 may receive a voltage measurement from remote sense point 260. Large brick 210 may ramp up a value of the output voltage until the voltage measurement equals a predefined value (e.g., 1 volt). At the same time, a current injector of small brick 220 may begin ramping up an amount of current being injected by converting the other voltage (e.g., the voltage received from power supply 250) into the current. The current injector of small brick 220 may inject the current into an impedance to produce a voltage at an output of small brick 220 (e.g., between 0.95 and 1.05 volts).

Process 400 may further include determining a first voltage measurement for a large brick (block 420). For example, remote sense line 270 may provide a first voltage measurement, from a remote sense point located at an output of large brick 210, to filter 240. The first voltage measurement may initially equal the output voltage of large brick 210. The first voltage measurement may pick up noise while being transmitted, via remote sense line 270, across PCB 200. Filter 240 may filter and amplify the first voltage measurement to eliminate the noise picked up by the first voltage measurement. Small brick 220 may receive the first voltage measurement (i.e., the desired voltage) from filter 240.

Process 400 may also include determining a second voltage measurement associated with a small brick (block 430). In one implementation, for example, small brick 220 may receive a second voltage measurement from a sense point (e.g., a remote sense point) located at an output of small brick 220. The second voltage measurement may equal a value of the voltage produced when the current injector of small brick 220 injects the current into the impedance located at an output of the small brick. In another implementation, small brick 220 may receive the second voltage measurement from remote sense point 280. Remote sense point 280 may be located in proximity to small brick 220, at a location between small brick 220 and large brick 210. In this instance, the second voltage measurement may equal a value slightly lower than the value of the voltage produced when the current injector of small brick 220 injects the current into the impedance.

Process 400 may also include determining whether the second voltage measurement is equal to or greater than the first voltage measurement (block 440). For example, small brick 220, or the current injector of small brick 220, may compare the values of the first voltage measurement of the output of large brick 210 and the second voltage measurement associated with the output of small brick 220.

If the second voltage measurement is less than the first voltage measurement (block 440—NO), process 400 may include ramping up again or continuing to ramp up (block 410). For example, the current injector of small brick 220 may ramp up an amount of current being injected when the second voltage measurement is less than the first voltage measurement. The current injector of small brick 220 may continue ramping up (i.e., repeating blocks 410-440 of process 400) the amount of current being injected until a value of the second voltage measurement is equal to or greater than the value of the first voltage measurement. In another implementation, the current injector of small brick 220 may determine a new ramped up amount of current to inject based on a difference between the second voltage measurement and the first voltage measurement. The current injector of small brick 220 may inject the new ramped up amount of current to produce the voltage output of small brick 220.

If the second voltage measurement is equal to or greater than the first voltage measurement (block 440—YES), process 400 may include maintaining a steady state (block 450). For example, while large brick 210 is ramping up the value of the voltage that large brick 210 is providing and the current injector of small brick 220 is ramping up the amount of current the current injector is injecting, PCB 200 may be in a transient state. When the second voltage measurement reaches (i.e., is equal to or greater than) the first voltage measurement, PCB 200 may be in a steady state.

In one embodiment, the current injector of small brick 220 may maintain the steady state by gradually ramping down the amount of current being injected by the current injector when the second voltage measurement is greater than the first voltage measurement. Small brick 220 may gradually ramp back up the amount of current being injected by the current injector when the second voltage measurement is less than the first voltage measurement. In another embodiment, the current injector of small brick 220 may stop injecting current when PCB 200 is in (again in) a steady state. PCB 200 may repeat process 400 when the second voltage measurement falls below a predefined value and returns to the transient state.

The foregoing description of implementations provides illustration and description, but is not intended to be exhaustive or to limit the implementations to the precise form disclosed. Modifications and variations are possible in light of the above teachings or may be acquired from practice of these implementations.

For example, while a series of blocks has been described with regard to FIG. 4, the order of the blocks may be modified in other implementations. Further, non-dependent blocks may be performed in parallel.

While certain voltages have been described above (e.g., 48 volts, 0.95 volts, 1.05 volts, 1 volt, etc.), these voltages are merely provided as examples. In other implementations, the voltages may differ.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining a first voltage measurement of an output of a first brick;
   determining a second voltage measurement associated with a second brick,
      the first brick being larger in size than the second brick,
      the first brick including storage capacitors and being on a printed circuit board (PCB),
      the first brick receiving power from a source outside of the PCB and delivering the power to the storage capacitors, and
      the first voltage measurement being based on the power;
   determining whether the second voltage measurement is less than the first voltage measurement; and
   ramping up an output voltage of the second brick when the second voltage measurement is less than the first voltage measurement.

2. The method of claim 1, ramping down the output voltage of the second brick when the first voltage measurement is less than the second voltage measurement.

3. The method of claim 1, where ramping up the output voltage comprises:
   increasing an amount of current being injected by a current injector of the second brick.

4. The method of claim 1, where determining the first voltage measurement comprises:
   receiving the first voltage measurement from a remote sense line connected to the first brick.

5. The method of claim 1, where determining the first voltage measurement further comprises:
   filtering the first voltage measurement to eliminate noise picked up by the first voltage measurement.

6. The method of claim 1, where determining the second voltage measurement comprises:
   receiving the second voltage measurement from a sensor located at an output of the second brick or from a remote sense point located between the second brick and the first brick.

7. The method of claim 1, further comprising:
   receiving an input voltage from a power supply; and
   converting the input voltage into the output voltage of the second brick.

8. The method of claim 1, further comprising:
   determining a third voltage measurement for an output of a third brick,
      the third brick being smaller in size than the first brick;
   determining whether the third voltage measurement is less than the first voltage measurement; and ramping up the output of the third brick when the third voltage measurement is less than the first voltage measurement.

9. A device comprising:
a circuit board comprising,
   a plurality of chips,
   a first brick to provide a first voltage to the plurality of chips,
      the first brick including storage capacitors, and
      the first brick being to:
         receive power from a source outside of the circuit board, and
         deliver the power to the storage capacitors,
   a second brick to provide, based on a value of the first voltage, a second voltage to the plurality of chips,
      the first brick being larger in size than the second brick, and
      the value of the first voltage being based on the power, and
   a remote sense line to provide the value of the first voltage from the first brick to the second brick,
      the second brick ramping up the second voltage when the second voltage is less than the first voltage.

10. The device of claim 9, where, when the second brick provides the second voltage, the second brick is to:
inject a current into an impedance to produce the second voltage.

11. The device of claim 10, where the second brick increases an amount of the current when the second voltage is less than the first voltage.

12. The device of claim 10, where the small brick decreases an amount of the current when the second voltage is greater than the first voltage.

13. The device of claim 9,
where the circuit board further comprises:
   a remote sense point to measure a third voltage at a location on the circuit board, and
where the first brick decreases a value of the first voltage when the third voltage is equal to or greater than a predefined value.

14. The device of claim 13, where the location is between the first brick and the second brick.

15. The device of claim 9, further comprising:
a third brick to provide a third voltage based on the value of the first voltage, and
a second remote sense line to provide the value of the first voltage from the first brick to the third brick.

16. A brick, of a printed circuit board, comprising:
a first connection to receive a first voltage measurement of an output of another brick on the printed circuit board,
   a size of the brick being smaller than a size of the other brick,
   the other brick including storage capacitors,
   the other brick receiving power from a source outside of the printed circuit board and delivering the power to the storage capacitors, and
   the first voltage measurement being based on the power;
a second connection to receive a second voltage measurement measured at a sensing point on the printed circuit board; and
a current injector to:
   determine an amount of current to inject based on the first voltage measurement and the second voltage measurement, and
   inject the amount of current into an impedance to produce a voltage output, where the voltage output is ramped up when the second voltage measurement is less than the first voltage measurement.

17. The brick of claim 16, where the first connection is to receive the first voltage measurement from a remote sense line connected to the other brick or from a filter connected to the remote sense line.

18. The brick of claim 16, where the second connection is to receive the second voltage measurement from a sensor that measures the voltage output of the brick or from a remote sense point that measures voltage at a location between the brick and the other brick.

19. The brick of claim 16,
where the amount of current is ramped up when the first voltage measurement is greater than the second voltage measurement, and
where the amount of current is ramped down when the first voltage measurement is less than the second voltage measurement.

20. The brick of claim 16, where, when determining the amount of current to inject, the current injector is to:
determine whether the second voltage measurement is less than a predefined threshold, and
determine the amount of current to inject only when the second voltage measurement is less than a predefined threshold.

* * * * *